3,840,632
Patented Oct. 8, 1974

3,840,632
SOLID PHASE POLYMERIZATION OF STRAIN HARDENED POLYESTERS
Emil J. Maxion, North Brunswick, and Andrew J. Foglia, Plainfield, N.J., assignors to Mobil Oil Corporation
No Drawing. Continuation of abandoned application Ser. No. 833,156, June 13, 1969. This application Mar. 17, 1972, Ser. No. 235,848
Int. Cl. B29c 25/00; C08g 17/06
U.S. Cl. 264—130                8 Claims

ABSTRACT OF THE DISCLOSURE

Thermoplastic linear polyester resins and prepolymers which are capable of orientation and derived from dihydric alcohol esters of carbocyclic dicarboxylic acids (e.g., polyethylene terephthalate typically having a reduced specific viscosity between about 0.4 and 1.3) are strain-hardened by stretching the resins, preferably 100% or more, in shaped form at temperatures below their softening points to substantially increase their sticking temperatures (typically 110–150° C. in the amorphous state) and the strain-hardened resins are then subjected to polycondensation in the solid state at temperatures above their original sticking temperatures and usually at improved polymerization rates to produce resins of substantially higher molecular weight. An inert heat-resistant anticaking agent is distributed on the surface of the solid resin before the maximum polycondensation temperature is reached.

This is a continuation of application Ser. No. 833,156, filed on June 13, 1969, now abandoned.

CROSS-REFERENCE TO RELATED APPLICATIONS

This application contains claims to features of the present invention in combination with certain other features which are described and claim per se in the concurrently filed applications Ser. Nos. 833,155 and 833,177 of Emil J. Maxion, now U.S. Pat. Nos. 3,728,309 and 3,544,523, respectively.

BACKGROUND OF THE INVENTION

Field of The Invention

This invention relates to an improved process for the preparation of high molecular weight linear polyester resins by the solid phase polymerization of polycondensation of polyesters of lower molecular weight.

Prior Art

There is an increasing demand for resins derived from the homopolymerization and copolymerization of esters of ethylene glycol and terephthalic acid in varying degrees of polymerization as exemplified by a number of average molecular weight of the order of 17,000 for textile fibers in general or about 30,00 for tire cord grade material, and interest is being displayed in the injection molding and blow molding of material of higher molecular weight as exemplified by 36,00 or more. The aforesaid molecular weights correspond to approximately 0.7, 1.15 and 1.14 RSV, respectively, where RSV represents the reduced specific viscosity of a solution of 5 grams of the resin dissolved in one liter of a mixture of equal weights of phenol and tetrachloroethane when determined at 25° C. and calculated in known manner.

The common commercial practice for producing polyethylene terephthalate involves melt-polymerization in which the material is maintained in the molten state at relatively high temperatures of 265 to 300° C. during the entire process. Typical preparations of this type are described in Whinfield et al. Pat. No. 2,465,319, in "Preparatory Methods of Polymer Chemistry" by W. R. Sorenson and T. W. Campbell, Interscience Publisher (1961) page 113 and in "Macromolecular Synthesis," C. G. Overberger, Ed., John Wiley & Sons (1963), Vol. 1, pages 17–23. Melt-polymerization has a number of limitations and disadvantages inasmuch as a simple stirred kettle apparatus can only be employed for polymerizing the material up to a maximum of about 0.4 RSV; then the material must be transferred to a heated and vented extruder or dough mixer type of apparatus capable of providing the powerful agitation necessary for the release of glycol evolved in the reaction from the highly viscous molten resin, and such further processing is limited to a maximum degree of polymerization equivalent to an RSV of approximately 1.3 which is rather unsatisfactory for plow or injection molding or other utilizations in which a very high molecular weight resin is desired. Besides requiring expensive equipment and a high consumption of power, difficulties are frequently encountered in this method in discoloration of the resin by excessive heat generated by the heavy shear forces in mixing the melt.

Many proposals for solid state polymerization of polyethylene terephthalate and similar polyesters have been made, and these have often mentioned the initial formation of a prepolymer or low order polymeric material by melt-polymerization followed by polycondensation of the prepolymer in the solid state by further heating at lower temperatures. While there are a number of known advantages for solid phase post-polymerization of polyesters as exemplified by the use of simpler equipment, lower manufacturing costs, improved product color, low content of combined diethylene glycol as well as higher melting points, and higher molecular weight polymers; nevertheless, the difficulties and problems experienced in solid state polycondensation as described hereinafter have precluded its commercial use on any substantial scale.

These earlier proposals for the solid phase polymerization have generally involved the processing of relatively small particles for instance, Pat. No. 2,534,028 mentions using fine powders smaller than 20 mesh to increase the reaction rate. Pat. Nos. 3,342,782, 3,330,809 and 3,075,952 disclose suspending prepolymers in the fluidized conditions in a stream of hot inert gas. In Pats. Nos. 2,901,466, 3,344,091 and 3,117,950, polymerization is accomplished by stirring and heating prepolymer particles in an inert atmosphere under very low pressure; and hot inert gases have been employed in polycondensing static beds of pulverized prepolymers at atmospheric pressure.

High polymerization rates are generally desirable in commercial practice and these require substantially elevated temperatures, but reaction temperatures have been severely restricted by the relatively low sticking temperature of polyester prepolymers. It is to be emphasized that the softening and sticking points are usually considerably below the crystalline or equilibrium melting temperatures of polyesters.

The expression "sticking temperature" is used herein to correspond with the definition on page 49 of the aforesaid Sorenson et al. text of the polymer-melting temperature as that temperature where a polymer sample becomes molten and leaves a trail when moved across a hot metal surface with moderate pressure; and this is commonly determined on a metal bar or elongated plate heated in such manner as to establish a temperature gradient along its length. A thermocouple may be used to determinne the temperature at the point where the trail begins.

The softening temperature is conveniently determined by the Vicat needle test described in ASTM method D1525-65T.

The crystalline melting temperature (equilibrium melting temperature) is also defined in the Sorenson et al. book on page 45 as "that temperature where the last trace of crystallinity disappears under equilibrium conditions." This melting point may be determined with substantial accuracy by differential scanning thermal analysis at a heating rate of 20° C./min., as described by W. W. Wendland, in "Chemical Analysis," Interscience Publishers, New York, N.Y., Vol. 19, Chapter 5 (1964), much more rapidly and also more conveniently that by actual equilibrium melting point determinations.

The solid phase polycondensation of polyesters has been held back mainly by the tendency of the polymer particles to agglomerate when the sticking temperature is reached and to form a large massive cake at temperatures well below the melting point of the resin. In the case of fluidized bed systems, fluidization is terminated by agglomeration. When static beds of resin particles fuse, the passage of an inert carrier gas and the removal of ethylene glycol from the conglomerate are greatly hampered with a corresponding reduction in process efficiency. In prepolymer beds of substantial depth, severe compaction takes place with both powders and granules. Finally, the difficulty in removing the caked resin from the reactor is greatly increased by its adhesion to equipment walls.

Polyethylene terephthalate exhibits various solid-liquid transition temperatures at which the material begins to flow under stress at a rate which is determined by the viscosity of the polymer. Amorphous resins of relatively low molecular weight (e.g., about 0.4 RSV) soften and collapse under a load at about 70° C. and particles of the material cohere to form an agglomerate and adhere to stainless steel at about 110–150° C. according to the load applied. Understandably, low molecular weight polymeric material deforms and sinters more readily than a higher molecular weight resin. The sticking temperature mentioned earlier provides a good overall measure of the adhesion and softening characteristics that promote agglomeration.

The resistance of polyester prepolymers and resins toward sticking at elevated temperatures is also affected by the composition of the polymer or copolymer; however, the crystalline melting point is similarly affected as a high melting resin has a higher sticking temperature than a resin having a low melting point. Accordingly, determination of the crystalline or equilibrium melting point affords a convenient method of assessing the effects of resin composition. For illustration, polyethylene terephthlate prepolymer usually contains a small amount of combined diethylene glycol and this has a profound effect upon the melting point of the resin. For instance, the melting point of polyethylene terephthalate containing only 0.6% combined diethylene glycol by weight is 270° C. whereas a similar resin with a content of 3.6% has a melting point of 250° C. On the other hand, the melting point of poly-(1,4-cyclohexanedimethylene terephthalate) is about 290° C.

The undesirable effects of such agglomeration in the solid phase polycondensation technique have long been recognized. Various proposals for solving the problem have been made with only limited degrees of success, because it is necessary to employ relatively low polymerization temperatures thereby restricting the rate of polycondensation. For instance, Patent No. 3,014,011 describes the treatment of polyethylene terephthalate pellets with steam or organic solvents and vapors to produce crystalline products which do not stick together at 160° C. In the process of Pat. No. 3,330,809, the particles of polyethylene terephthalate are kept in vigorous motion while being instantaneously heated through a critical "glass temperature" range from 69° C. to about 130–200° and the crystallized polymer is then polycondensed as a fluidized powder at 218° C. Heighton et al. Pat. No. 3,405,098 is concerned with forming an amorphous prepolymer by quenching a melt-polymerization product followed by heating at 150–200° C. to form a partially crystallized polyester that is ground to 20–200 mesh and then further polymerized at 215–225° C. under vacuum. The maximum viscosity of the prepolymer used in that process appears to be limited considerably by grinding and other considerations; and the polycondensation temperatures are also quite restricted for it is stated that agglomeration occurs above 235° C. no matter how crystalline the prepolymer may be and there is also a caution as to fluidization difficulties above 225° C. Small charges of resin have also been suggested to minimize agglomeration, but this entails an undesirable reduction in productive capacity. While higher temperatures ranging up to 250° C. have been mentioned in the prior art for the solid state polycondensation of polyethylene terephthalate, such disclosures apparently relate only to laboratory scale experimentation without specifying how the agglomeration problem was solved; hence there is no reason to presume that large scale operations at such temperatures were feasible heretofore.

In view of the limitations and difficulties encountered with prior methods of polycondensing polyesters, there is a need for improved methods for performing such polycondensations in the solid state in general, particularly in a simpler and more economical process, as well as for providing greater flexibility as to reaction rates by the use of higher reaction temperatures and/or obtaining higher molecular weight products than were feasible in prior commercial production.

SUMMARY OF THE INVENTION

The present invention is an improved process for increasing the molecular weight of polyester resins in which a shaped thermoplastic resin which is capable of orientation and contains linear polymers (homopolymers or copolymers) of esters of at least one dihydric alcohol and at least one carbocyclic dicarboxylic acid is strain-hardened by stretching the resin sufficiently to increase its sticking temperature, and the strain-hardened resin is thereafter subjected in the solid phase to polycondensation conditions for a period sufficient to substantially increase its molecular weight.

Narrower aspects of the invention relate to one or more of such features as treating a resin that has a reduced specific viscosity (RSV) as defined hereinbefore of at least about 0.2, and preferably in the range of about 0.4 to 1.3 or more, and a resin crystallinity of less than 50% by weight (desirably below 40%) prior to stretching; elongating the resin at least about 20%, and preferably more than 100%, in at least one direction; polycondensing the strain-hardened resin at temperatures above its original sticking temperature, as exemplified by heating at temperatures of at least 200° C. and often at 230° C. or even higher in certain instances; preferred types of resins as exemplified by polyethylene terephthalate; as well as the combination of stretching with methods of the aforesaid cross-referenced applications for minimizing or eliminating adhesion of the resin by adding anticaking agents and/or by increasing the polycondensation temperature after the reaction has progressed somewhat.

DESCRIPTION OF SPECIFIC EMBODIMENTS

The instant process provides important benefits in instantaneously raising the sticking temperature of a polyester of low molecular weight, also known as prepolymer, so that the material can be efficiently and economically polymerized or polycondensed over a wider range of polymerization temperatures and other conditions than heretofore. Also, the degree of polymerization may optionally be carried further to provide resins with molecular weights higher than those previously obtainable in commercial operations. These benefits can be obtained by various embodiments of a simple stretching operation which may be carried out on known equipment at very little expense. Moreover, the stretching may desirably be carried out in continuous fashion in commercial operations with very simple and trouble-free control of the strain hardening.

While the present description is concerned to a large extent with the polycondensation of polyethylene terephthalate prepolymer by reason of the commercial importance of this material and also to provide valid comparisons, the method is also suitable for the treatment of similar homopolymers and copolymers. These may be exemplified by the crystallizable homo- and copolymeric esters of terephthalic, chloroterephthalic, nitroterephthalic or hydrogenated terephthalic acids with one or more glycols, such as ethylene glycol, propylene glycol, 2,2-dimethyl-propanediol-1,3, 1,4-butene glycol and 1,4-cyclohexanedimethanol, as well as copolymers of the type which may be derived from one or more of those glycols and a plurality of acids comprising (1) substituted and unsubstituted terephthalic acids as just described and also (2) one or more of such acids as adipic, sebacic or 2,6-naphthalene dicarboxylic acids. For instance, suitable copolyesters may be prepared from terephthalic acid and a mixture of ethylene glycol and 2,2-dimethyl-propanediol-1,3 or from ethylene glycol and from a mixture of a major proportion of terephthalic acid and a minor proportion of isophthalic acid. It will be appreciated that the polyesters involved here are not limited to those prepared from such glycols and acids per se, for other preparatory methods are usually suitable as exemplified by the esterification of terephthalic acid with alkylene oxides, such as ethylene oxide, or the transesterification of dimethyl terephthalate with ethylene glycol.

Any prepolymer of such linear polyesters which has a crystallinity of less than about 50% and an RSV of at least about 0.2 (number average molecular weight of at least about 4000 in the case of polyethylene terephthalate) or more may be advantageously strain hardened according to the present process; the more desirable starting materials have a crystallinity below about 40% and an RSV of about 0.4 to 1.3 or more (polyethylene terephthalate molecular weight about about 9000). In this operation, the shaped resin article, typically in the form of a filament or thin sheet, is elongated about 20% to 1000% or more by drawing or stretching it usually beyond its elastic limit at temperatures ranging up to within about 5 or 10° C. (e.g., up to 255° C. in some cases) of the equilibrium melting point. Thus, temperatures between about 0° and 240° C. are generally suitable and temperatures above about 50° C. are usually preferred (e.g., 90–120° C. for polyethylene terephthalate) as they permit higher draw ratios than the lower temperatures. Operations of this general type are often loosely described as "cold drawing." Also, the stretching may be performed in a plurality of stages at the same or different temperature levels. The elongation of the resin usually amounts to at least 30%, and preferably is between about 100 and 700%, to insure sufficient elevation of the sticking temperature of the resin.

The rate of draw may be varied from about 10% to 100,000% per minute and draw rates of 5000 to 40,000% per minute are suggested for stretching temperatures in the 90–120° C. range. The draw rate, elongation and stretch temperature are correlated to avoid parting the resin during stretching, particularly when the starting material is of a brittle nature.

While a stretch in one direction is generally adequate for the present purposes, sheet material may be stretched in two or more directions, and the amount of stretching in each direction may correspond with that described herein for unidirectional stretching. In addition to increasing the sticking temperature, stretching also hardens the resin. The crystallinity of the resin is also increased whether starting with an amorphous or a partly crystalline material, and the crystalline resin usually becomes oriented in the process. These effects appear to take place instantaneously; hence storage or ageing of the strain-hardened resin is not necessary prior to subjecting it to solid phase polycondensation.

The drawing operation may be carried out on conventional equipment with the prepolymer prepared by melt polymerization being extruded through a suitable die in the form of a thin film, a heavier sheet or filaments ranging from very fine filaments to rods of ¼ inch or greater diameter. The extruded material may be cooled in air or water or on a cooled metal surface and then drawn by the tension exerted by godet rolls rotating at a controlled linear speed higher than the extrusion rate and adjusted to provide the desired degree of stretch. Feed or casting rolls are commonly utilized between the extrusion die and the godet rolls to avoid exerting tension directly upon the extrudate leaving the die. Similarly, a flat film or sheet may be elongated or stretched by passage through a pair of feed rolls turning at a speed corresponding to the extrusion rate and then through a pair of nip rolls driven at a higher speed to impart the desired draw. A film or sheet may also be stretched in either or both of the machine and transverse directions on a machine of the tenter type or other suitable equipment.

The stretched resin is often subdivided for the polycondensation step as by flaking or chopping a film or sheet into small pieces or by chopping or cutting filaments, ribbons or rods. In addition, the chopped material may be ground or pulverized in a suitable mill to produce a fine powder suitable for polymerization in a fluidized operation.

In view of the adaptability of the strain hardening step to continuous operations, it is also contemplated that the strain hardened resin need not be subdivided but can be continuously passed directly from the stretching apparatus through suitable heated polymerization equipment as a continuous web or strand or bundle of unbroken filaments. For instance, in polycondensations carried out at or near atmospheric pressure, a continuous web, filament or a rope composed of filaments of the resin can be conveyed after the strain hardening step into an oven operating at polycondensation temperatures and then passed upward and downward over a large number of rolls or pulleys so arranged in the oven as to provide an adequate residence time for polycondensation to the desired extent as the web or strand moves continuously through the oven. For polycondensing under subatmospheric pressures, it would be possible to provide a suitable airlock, or perhaps a liquid seal in the form of a sufficiently deep pool of mercury, or another suitable device at each end of the continuous polymerization oven to prevent the entrance of excessive amounts of air.

In many instances, it may be desired to polycondense the strain-hardened resin in the form of a static bed of granules, pellets or flakes of the resin or to employ a fluidized bed of fine resin particles, and continually maintaining a flow of an inert carrier gas (e.g., nitrogen) through the bed is often desirable to promote agitation and to carry off glycol liberated during the polymerization reaction. Regardless of the polymerization system utilized, a vacuum system or other provision should be made for removing the glycol liberated in the reaction. Suitable polycondensation temperatures may range from a temperature just elevated sufficiently above the threshold temperature of the polymerization reaction (typically 180° C. for polyethylene terephthalate) to provide an acceptable reaction rate up to temperatures within 2 or 3° of the sticking temperature of the strain-hardened resin. The actual temperatures differ somewhat for polymers or copolymers of different composition and of different molecular weight or RSV. In the case of polyethylene terephthalate, the polycondensation may be carried out at temperatures ranging from about 200 to 270° C. and preferably between about 230 and 270° C. In general, the polycondensation temperature is substantially above the original sticking temperature of the resin. Usually, it is preferred to employ the highest temperatures possible while avoiding sticking or agglomeration, sometimes only slightly below the crystalline melting point, in order to achieve the fastest reaction rate; but it may be desirable in some instances to utilize considerably lower polycondensation temperatures (e.g., about 200–235° C. for polyethylene terephthalate) for reactions in deep or heavily loaded resin beds or where intensive shearing or rubbing is encountered as the tendency toward agglomeration is more pronounced under these conditions.

The polycondensation of the strain-hardened resin may desirably be carried out at pressures in the range of about 0.001 to 1000 mm. of mercury, and subatmospheric pressures are usually preferred for efficient removal of the glycol evolved. For the same purpose, it is often advantageous to have at least a small flow of an inert gas, such as nitrogen, carbon dioxide, helium or hydrocarbons boiling below 300° C. passing through a polycondensation reactor or apparatus to assist in carrying off the glycol formed.

The time required for polycondensation is dependent upon a number of variables including reaction temperatures, the composition and molecular weight of the prepolymer, the catalyst employed and the desired molecular weight for the product. In general, the reaction time may range from as little as 10 minutes for the moderate polycondensation of a prepolymer of considerable molecular weight at high temperatures to as much as 48 hours for polymerizing a low order prepolymer to an extremely high molecular weight at a relatively low polycondensation temperature, but more often times with the range of 1 to 20 hours are employed.

The method of the present invention may be employed in conjunction with either or both of the particular techniques described and claimed per se in the aforementioned cross-referenced applications, and the disclosures of said applications are incorporated herein by reference. Such combination procedures are particularly useful in instances where the resin has only a moderately elevated sticking temperature after the stretching step rather than the extremely high sticking temperatures obtained in many cases. For example, where certain strain-hardened polyethylene terephthalate prepolymers display a sticking temperature of 235° C., it is not necessary to keep the resin or reaction temperature below 235° for the duration of the poly-condensation reaction, because the procedures disclosed in the aforesaid applications permit a reaction temperature of 250° or more to be employed either for the entire period of polycondensation or its later stages.

Said applicatin Ser. No. 833,155 describes a method of progressive heating wherein the resin is initially polycondensed at a temperature well above its original or amorphous sticking temperature and also above the threshold temperature of the polycondensation reaction but below the initial sticking temperature of the resin in the crystalline state. As polycondensation progresses under these conditions to a substantial extent, the sticking temperature of the crystalline resin increases and the resin also becomes harder as indicated by an advancing Vicat softening point. Then, after a period which may be as short as a half hour or less, the reaction temperature is substantially elevated either gradually or in one or more steps while continuing to hold it below (e.g., often 2 to 12° C. below) the actual resin sticking temperature at any given moment. Following the initial polycondensation, the temperature may be raised to a maximum in the range of about 2 to 10° C. below the final crystalline melting point of the resin, and it is to be noted that this melting point also often rises considerably in the course of the condensation reaction. For illustration, in the case of a polyethylene terephthalate prepolymer that has an amorphous sticking temperature of 140° C. and develops a sticking temperature of 235° upon stretching, the strain-hardened material may be polycondensed initially at temperatures ranging up to about 233°; then after the sticking temperature of the strain-hardened resin has risen to 250°, the reaction temperature level may be increased to somewhat above 245° C. in obtaining the advantages described herein for high temperature polycondensation.

Also, an inert, heat-resistant anticaking agent may be distributed on the surface or surfaces of the polyester resin in accordance with the teachings of said application Ser. No. 833,177.

By means of this additive it is then possible to carry out the polycondensation at temperatures which are considerably above the initial sticking temperature of the untreated, strain-hardened resin alone (i.e., tested in the absence of the anticaking agent) and extending up to within about 2° of the crystalline melting point of the resin.

Representative anticaking agents are minerals of natural occurrence, such as talc, kaolin, anthophyllite asbestos, gypsum, etc. Many inorganic oxides are also suitable including oxides and carbonates of silicon, aluminum, titanium, calcium, iron and magnesium. Titanium dioxide may be used to advantage in relatively small proportions where a delustering of the resin is desired, or in much larger quantities that are left in the resin composition to pigment the resin in its eventual fabrication. Fumed silicas are particularly desirable by reason of their high surface area and they may be used in their pristine state or when coated with agents to render them hydrophobic or hydrophilic. Aluminum hydroxide and impalpable boric acid are also appropriate for the purpose. Oils boiling above 300° C., as exemplified by polysiloxanes, alkyl-substituted polysiloxanes and similar silicone oils as well as liquid fluorocarbons are also effective, as are the non-alkali metal soaps of higher fatty acids containing 12 or more carbon atoms, such as aluminum, magnesium and calcium stearate. In general, any of the many known anticaking agents which are both inert with respect to polyester resins and refractory in nature, that is capable of remaining nontacky and not subject to excessive vaporization at temperatures up to about 300° C., may be utilized.

In the case of solid anticaking additives, their particle sizes may range from less than one micron up to about 30 mesh, and they may be applied to the resin by tumbling in a drum or other device suitable for mixing solid materials. On the other hand, the oil additives are readily distributed on the resin by spraying or dipping, and they may be diluted with a miscible, inert and relatively volatile solvent (e.g., hexane or xylene) for more uniform application of controlled amounts of the oil. From about 0.1 to 10 parts by weight of the solid or liquid anticaking agent are usually employed in treating 100 parts of the resin. The preferred amount is typically 3 parts or less and may be easily determined by simple experiments with the selected agent and resins. The agent may be applied to the solid resin at any time prior to reaching the maximum polycondensation temperature, that is before or after either the stretching step or a subdividing operation, or even during polycondensation.

For illustration, a polyethylene terephthalate prepolymer that has a sticking temperature of 235° C. and a melting point of 260° after stretching may be chopped into pellets or flakes, and mixed with 1% of 325-mesh talc; then it may be charged to a reactor preheated to 255° and maintained at this temperature throughout the entire polycondensation reaction without agglomeration in producing a polymer of high molecular weight.

A catalyst is necessary to obtain polymeric products of such high molecular weight, but the catalyst is usually added during the preparation of the prepolymer since the catalysts known to be effective for melt-polymerization also generally provide good results in the solid state polycondensation of polyesters as suggested by L. C. Hsu in NASA Technical Note D-4335 (1968). This invention, therefore, provides for a process in which the solid state polycondensation takes place in the presence of a suitable catalyst which may be contained in the prepolymer. Many suitable catalysts are set forth in the comprehensive articles of R. E. Wilfond in J. Polymer Sci., *54*, 385–510 (1961) and W. Griehl and G. Schnock in J. Polymer Sci., *30*, 413–422 (1958) as well as the prior patents cited hereinbefore. Among the many good catalysts are antimony trioxide, zinc acetate, tin oxalate, cobaltous acetate, lithium glycoloxide, germanium dioxide, stannous formate and tetrabutyl titanate, to name only a few.

It will be appreciated from the present disclosure that the instant process provides significant advantages, particularly in respect to flexibility, speed and simplicity, in solid state polycondensation by permitting the use in many cases of higher reaction temperatures than were heretofore feasible in polyester reactions of this type and also in allowing the polymerization to be carried to heretofore unobtainable degrees as repeated by an RSV of 4 or more which corresponds to molecular weights of several hundred thousand or higher. There is some reason to believe that in at least some instances the beneficial results obtained by the present method may be attributed in part to orientation of the resin during stretching. However, this invention is not yet fully understood, and it should not be regarded as restricted to any theory relating to the manner in which it achieves the effects described herein.

For a better understanding of the nature and objects of this invention as well as its benefits and advantages, reference should be had to the following examples which are set forth for purposes of illustration rathen than limitation of the scope of the invention. Unless otherwise specified, all proportions are set forth in terms of weight and all temperatures as degrees centigrade.

EXAMPLE 1

A melt-polymerized polyethylene terephthalate with a 0.025% content of antimony trioxide catalyst is extruded in the molten state at a temperature of about 270° C. through a circular die as a heavy monofilament of 3/16 inch diameter and immediately quenched in water at 20° C. After drying in air, this amorphous material is found to have an RSV of 0.98. Upon rubbing a section of the rod-like extrudate against a polished stainless steel plate heated to provide a temperature gradient along its length and precalibrated with a thermocouple, the sticking temperature is found to be 225° C. and noticeable softening also occurs at this temperature.

A 12-inch section of the amorphous rod is heated to 110° C. in a tubular electric oven and then drawn to three times its original length. A test indicates that the sticking temperature of the drawn material is 252° C. but no signs of softening are observed at that heat level. The elongated rod is cut into 1/8 lengths and polycondensed by heating in a glass reaction vessel for 3 hours at 252° under a subatmospheric pressure of 0.01 mm. of mercury without displaying any tendency toward agglomeration. After cooling the vessel, the product is removed without encountering any difficulty from particles sticking to one another or to the wall of the vessel and its RSV is now found to be 2.35. There is no evidence of thermal degradation inasmuch as the product and the amorphous prepolymer are of the same color.

EXAMPLE 2

Pellets of the polyethylene terephthalate product of a melt polymerization process are compression molded in a laboratory press into a sheet of 0.030 inch thickness between press platens heated to about 275° C. and the sheet is rapidly cooled by circulating cooled water through the platens. The resulting amorphous resin sheet is observed to soften at 80° C. and to stick tenaciously to stainless steel at a temperature of about 225° C. This material has an RSV of 0.8.

A "dogbone" specimen of the type employed for tensile testing in ASTM test method D-412 is die-cut from the sheet of resin and mounted between the jaws of an "Instron" tensile testing machine. An electrically heated chamber is installed around the test specimen and after raising the temperature of the latter to 105° C., the central part of the sample (i.e., the narrow portion between its shoulders) is stretched to a length of about 4.5 inches or 4 times its original length. After being released from the machine, the elongated portion of the specimen is found to have a softening point of about 200° C. and a sticking temperature on stainless steel at 245° C.

The strain-hardened sections of a number of specimens stretched in the same manner are cut into 1/2-inch lengths and placed in a glass test tube which is connected to a vacuum pump. After evacuating the tube to an absolute pressure of .005 mm. of mercury, it is then placed for 3 hours in a stirred oil bath maintained at 240° C. Upon removing the tube from a bath and cooling it, no evidence of sticking or deformation of the resin strips is apparent and they are removed from the tube without difficulty. The RSV of this polycondensed product is found to be 2.2.

For comparative purposes an effort is made to similarly polycondense amorphous polyethylene terephthalate sheet material prepared in the same fashion except for omitting the stretching operation. The unstretched material is cut into 1/4 inch x 1/2 inch strips and placed in the test tube which is evacuated and placed in the oil bath at 240° C. as before. Widespread softening of the resin strips is observed within three minutes. After 20 minutes in the bath the tube is removed and cooled. When the tube is opened the polyethylene terephthalate strips are observed to be sticking to one another and also to the walls of the tube.

EXAMPLE 3

A polyethylene terephthalate prepolymer of lower molecular weight is extruded through 3/16 inch circular die as in Example 1 and quenched on an air-cooled stainless steel belt. The RSV of this monofilament is 0.36 and it softens noticeably at 80° C. and becomes very deformable at 100° C. Its sticking temperature is found to be 145° C.

Upon cutting this rod-like material into 3/16 inch lengths and charging it into a 4-foot long stainless steel tube of 4 inch diameter equipped with inlet and outlet connections for passing nitrogen through the bed of resin particles, the tube is placed in a circulating air oven preheated to 230° C. with nitrogen flowing through the tube at the rate of 500 cc./min. After 10 hours of heating, the oven is cooled to room temperature and the tube removed and opened. Inspection of the tube contents discloses that gross compaction and sintering of the resin particles occurred and considerable difficulty is encountered in removing the contents with the aid of a chisel and hammer. After grinding the sintered mass to 20 mesh in a Wiley grinding mill, its RSV is found to be only 0.47.

Extrusion of the same amorphous polyethylene terephthalate monofilament is continued but the quenched filament is pulled through a tubular oven operating at 130° C. and wound on a constant speed godet roll with its speed adjusted to draw the filament to 3 times its original length (200% elongation) during its passage through the oven. This stretching operation is found to convert the quenched filament from a quite brittle state into a very tough and flexible article which displays little tendency toward softening at 200° C. The drawn filament is found to have a sticking temperature of 230° C. After being cut into 3/16 inch lengths and subjecting to the polycondensation conditions described immediately hereinbefore in the same stainless steel reaction tube, quite different results are obtained. The product obtained by polymerizing the strain-hardened charge is friable and easily removed from the reaction tube, and the 0.69 RSV of the product is indicative of a substantially higher degree of polycondensation than occurred in the unstretched material.

EXAMPLE 4

More of the same prepolymer is extruded, continuously stretched in a 3:1 ratio and cut into small pieces as in Example 3.

The resulting coarse particles are thoroughly mixed with 1% talc in a 100:1 weight ratio and polycondensed for 10 hours according to the procedure of Example 3 except for preheating and maintaining the oven temperature at 250° C. No difficulties are encountered in polycondensing the stretchhardened charge at this higher temperature, and this is attributed to the presence of the anticaking agent. This procedure increases the original 0.36 RSV of the resin to a value well above 0.69.

EXAMPLE 5

The procedure of Example 3 is again repeated with another strain-hardened and cut batch of the same prepolymer except for subjecting the cut resin particles to polycondensation at temperatures which are increased stepwise as polymerization progresses instead of maintaining a constant temperature.

After allowing the reaction to proceed at an even temperature of 230° C. for a period of one hour in the initial polycondensation stage, the temperature of the oven is elevated to 240° C. for a period of one hour and finally to a level of 255° C. for a period of 8 hours. The product of polymerizing the strain-hardened charge by this progressive heating technique is also friable and readily removed from the reaction tube wherein its RSV increases from 0.36 to well over 0.69. In view of the absence of sticking difficulties even though the temperatures of the intermediate and final reaction stages exceed the initial sticking temperature of the resin in the strain-hardened condition, it is apparent that the actual sticking temperature of the charge increases as polycondensation progresses during the reaction.

EXAMPLE 6

Amorphous polyethylene terephthalate chips prepared by the melt-polymerization of dimethyl terephthalate and ethylene glycol catalyzed with tetrabutyl titanate and zinc acetylacetonate is extruded through a narrow die slot onto a chilled casting roll. Samples of the resulting web have an RSV of 0.76 and are observed to soften at approximately 80° C. and evidence a sticking temperature of 225° C.

This web is then subjected to biaxial orientation in mutually perpendicular directions in a commercial tenter by stretching at 110° C. in a 3.5:1 ratio (250% elongation) in both machine and transverse directions followed by a further 1.5:1 stretch in the machine direction only at 140° C. in another heated zone. After the tentering operation, the sticking temperature is found to be 252° C., and the film is cut into ¼" x 1" strips and placed in a tubular reactor which is then evacuated to 0.01 millimeter mercury absolute pressure and immersed in a 250 ° C. oil bath for polycondensation over a period of 4 hours. No difficulties are encountered with sticking of the strips and the RSV of the product is found to be 2.75 which is indicative of a very high molecular weight polymer.

While the present invention has been described in specific detail in a limited number of embodiments for purposes of full disclosure and valid comparisons, it will be apparent to those skilled in the art that there are many other embodiments and modifications encompassed within the purview of this invention. Accordingly, the present invention should not be considered at limited in any particulars except as may be set forth in the appended claims or required by the prior art.

What is claimed is:

1. A process for increasing the molecular weight of polyester resins which consists essentially of strain hardening a shaped orientable thermoplastic solid resin containing linear polymers of esters of at least one dihydric alcohol and at least one carbocylic dicarboxylic acid by stretching, at a temperature between about 50° C. and about 240° C., said resin sufficiently to substantially increase its sticking temperature and thereafter subjecting said strain-hardened resin in the solid state to polycondensation conditions in the presence of a suitable polymerization catalyst wherein the resin is maintained at a temperature of from about 200° C. to about 270° C. and a pressure of from about 0.001 mm. to about 1000 mm. of mercury for a period of at least 10 minutes to about 48 hours and sufficient to substantially increase the molecular weight of said resin; in which an inert heat-resistant anticaking agent is distributed on the surface of said solid resin prior to reaching the maximum temperature employed in polycondensation.

2. A process according to Claim 1 in which 100 parts by weight of said resin are treated with between about 0.1 and 10 parts of a refractory anticaking substance of the group consisting of solid minerals, oxides and carbonates of silicon, aluminum, titanium, calcium, iron and magnesium, and nonalkali metal soaps of higher fatty acids in finely divided particle form, liquid polysiloxanes boiling above 300° C. and liquid fluorocarbons boiling above 300° C.

3. A process for increasing the molecular weight of polyester resins which consists essentially of strain hardening a shaped orientable thermoplastic polyethylene terephthalate having a crystallinity of less than about 40% and a reduced specific viscosity between about 0.4 and 1.3 by stretching, at a temperature between about 50° C. and about 240° C., said polyethylene terephthalate under conditions adapted to produce at least partial orientation of said resin and an elongation of at least about 100% in at least one dimension of the resin, sufficiently to substantially increase its sticking temperature and thereafter subjecting said strain-hardened polyethylene terephthalate in the solid state to polycondensation conditions in the presence of a suitable polymerization catalyst wherein the polyethylene terephthalate is maintained at a temperature substantially higher than the sticking temperature of said resin prior to stretching of from about 200° C. to about 270° C. and a pressure of from about 0.001 mm. to about 1000 mm. of mercury for a period of at least 10 minutes to about 48 hours and sufficient to substantially increase the molecular weight of said resin; in which between about 0.1 and 10 parts of an inert heat-resistant anticaking agent are distributed on the surface of 100 parts of said solid resin prior to reaching the maximum temperature employed in polycondensation and said agent is a refractory substance of the group consisting of solid minerals, oxides and carbonates of silicon, aluminum, titanium, calcium, iron and magnesium, and nonalkali metal soaps of higher fatty acids in finely divided particle form, liquid polysiloxanes boiling above 300° C. and liquid fluorocarbons boiling above 300° C.

4. A process according to Claim 1 in which said anticaking agent is of the group consisting of talc and silica aerosil.

5. A process for increasing the molecular weight of polyester resins which consists essentially of strain hardening a shaped orientable thermoplastic solid resin containing linear polymers of esters of at least one dihydric alcohol and at least one carbocylic dicarboxylic acid by stretching, at a temperature between about 50° C. and about 240° C., said resin sufficiently to substantially increase its sticking temperature subdividing said strain-hardened resin into particles and thereafter subjecting said strain-hardened resin in the solid state to polycondensation conditions in the presence of a suitable polymerization catalyst wherein the resin is maintained at a temperature of from about 200° C. to about 270° C. and a pressure of from about 0.001 mm. to about 1000 mm. of mercury for a period of at least 10 minutes to about 48 hours and sufficient to substantially increase the molecular weight of said resin; in which an inert heat-resistant anticaking agent is distributed on the surface of said solid resin prior to reaching the maximum temperature employed in polycondensation.

6. A process according to Claim 5 in which 100 parts by weight of said resin are treated with between about 0.1 and 10 parts of a refractory anticaking substance of the group consisting of solid minerals, oxides and carbonates of silicon, aluminum, titanium, calcium, iron and magnesium, and nonalkali metal soaps of higher fatty acids in finely divided particle form, liquid polysiloxanes boiling above 300° C. and liquid fluorocarbons boiling above 300° C.

7. A process for increasing the molecular weight of polyester resins which consists essentially of strain hardening a shaped orientable thermoplastic polyethylene terephthalate having a crystallinity of less than about 40% and a reduced specific viscosity between about 0.4 and 1.3 by stretching, at a temperature betwen about 50° C. and about 240° C., said polyethylene terephthalate under conditions adapted to produce at least partial orientation of said resin and an elongation of at least about 100% in at least one dimension of the resin, sufficiently to substantially increase its sticking temperature subdividing said strain-hardened resin into particles and thereafter subjecting said strain-hardened polyethylene terephthalate in the solid state to polycondensation conditions in the presence of a suitable polymerization catalyst wherein the polyethylene terephthalate is maintained at a temperature substantially higher than the sticking temperature of said resin prior to stretching of from about 200° C. to about 270° C. and a pressure of from about 0.001 mm. to about 1000 mm. of mercury for a period of at least 10 minutes to about 48 hours and sufficient to substantially increase the molecular weight of said resin; in which between about 0.1 and 10 parts of an inert heat-resistant anticaking agent are distributed on the surface of 100 parts of said solid resin prior to reaching the maximum temperature employed in polycondensation and said agent is a refractory substance of the group consisting of solid minerals, oxides and carbonates of silicon, aluminum, titanium, calcium, iron and magnesium, and nonalkali metal soaps of higher fatty acids in finely divided particle form, liquid polysiloxanes boiling above 300° C. and liquid fluorocarbons boiling above 300° C.

8. A process according to Claim 7 in which said anticaking agent is of the group consisting of talc and silica aerosil.

References Cited
UNITED STATES PATENTS

| | | | |
|---|---|---|---|
| 3,551,548 | 12/1970 | Brignac | 264—176 F |
| 3,544,525 | 12/1970 | Balint | 260—75 M |
| 2,611,923 | 9/1952 | Hume | 264—290 T |
| 2,615,784 | 10/1952 | McClellan | 264—342 RE |
| 2,509,741 | 5/1950 | Miles | 264—342 RE |
| 2,071,250 | 2/1937 | Carothers | 260—78 A |
| 3,544,523 | 12/1970 | Maxion | 260—75 M |

OTHER REFERENCES

Encyclopedia of Chemical Technology, Kirk-Othmer, 2nd edition, vol. 16, "Polyester," Wiley, 1968, pp. 174–177.

ROBERT F. WHITE, Primary Examiner

J. B. LOWE, Assistant Examiner

U.S. Cl. X.R.

260—75 M; 264—143, 236, 290 T

PO-1050
(5/69)

UNITED STATES PATENT OFFICE
CERTIFICATE OF CORRECTION

Patent No. 3,840,632          Dated October 8, 1974

Inventor(s) EMIL J. MAXION and ANDREW J. FOGLIA

It is certified that error appears in the above-identified patent and that said Letters Patent are hereby corrected as shown below:

| | |
|---|---|
| Column 1, line 49 | "of" should be --or--. |
| Column 1, line 58 | "30,00" should be --30,000--. |
| Column 1, line 61 | "36,00" should be --36,000--. |
| Column 1, line 62 | "1.14" should be --1,4--. |
| Column 2, line 16 | "plow" should be --blow--. |
| Column 3, line 10 | "that" should be --than--. |
| Column 5, line 42 | "about about" should be --above about--. |
| Column 9, line 34 | "rathen" should be --rather--. |
| Column 12, line 62 | "Claim 1" should be --Claim 3--. |

Signed and sealed this 24th day of December 1974.

(SEAL)
Attest:

McCOY M. GIBSON JR.
Attesting Officer

C. MARSHALL DANN
Commissioner of Patents